United States Patent [19]
LaFiandra

[11] Patent Number: 6,048,070
[45] Date of Patent: *Apr. 11, 2000

[54] DURABLE LARGE STROKE DEFORMABLE MIRROR

[75] Inventor: Carlo F. LaFiandra, New Canaan, Conn.

[73] Assignee: Raytheon Company, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/608,105

[22] Filed: Feb. 28, 1996

[51] Int. Cl.$^7$ .............................. G02B 5/08; G02B 7/182
[52] U.S. Cl. .......................... 359/846; 359/845; 359/849
[58] Field of Search ................................... 359/845, 846, 359/848, 849, 224

[56] References Cited

U.S. PATENT DOCUMENTS

| | | | |
|---|---|---|---|
| 4,451,119 | 5/1984 | Meyers et al. | 359/846 |
| 4,657,358 | 4/1987 | Anthony et al. | 359/845 |
| 4,659,548 | 4/1987 | Gubbay et al. | 419/10 |
| 4,814,232 | 3/1989 | Bluege et al. | 428/450 |
| 4,934,803 | 6/1990 | Ealey | 359/845 |
| 4,940,318 | 7/1990 | Ealey et al. | 359/849 |
| 5,037,190 | 8/1991 | Ealey et al. | 359/845 |
| 5,208,704 | 5/1993 | Zito | 359/848 |
| 5,210,653 | 5/1993 | Schell | 359/846 |
| 5,357,825 | 10/1994 | Costello et al. | 74/479 |

*Primary Examiner*—Cassandra Spyrou
*Assistant Examiner*—Mark A. Robinson
*Attorney, Agent, or Firm*—William C. Schubert; Glenn H. Lenzen, Jr.

[57] ABSTRACT

A durable large stroke deformable mirror. In the illustrative embodiment, the mirror (10') includes a faceplate (12') constructed of a first material, and a backplate (14') constructed of a second material different from the first material. The faceplate (12') is connected to the backplate (14') at an interface (16'), and the backplate (14') is connected to a set of actuators (20') capable of inducing large mirror (10') deflections. In a specific embodiment, the first material is chosen for its excellent optical qualities and the second material is chosen for its flexibility and durability, allowing for large mirror (10') deflections. To ensure the durability of the connection at the interface (16'), the faceplate (12') and the backplate (14') have matching coefficients of thermal expansion. In addition, the interface (16') is placed at the neutral axis of the mirror (10') for reducing stresses at the interface (16'). The interface (16') also contains fluid-filled channels (26') for carrying heat away from the mirror (10'), reducing temperature related mirror (10') distortions.

12 Claims, 1 Drawing Sheet

DURABLE LARGE STROKE DEFORMABLE MIRROR

BACKGROUND OF THE INVENTION

1. Field of Invention

This invention relates to deformable mirrors. Specifically, the present invention relates to large stroke deformable mirrors.

2. Description of the Related Art

Deformable mirrors are used in a variety of demanding applications including telescopes, infrared detectors, and spacecraft remote sensing devices. Such applications often demand mirrors with excellent optical qualities, durability, large stroke or range of movement, and heat exchange capability.

Historically, to achieve the required heat exchange capability, two plates of similar material were joined. The use of similar material for the front plate, and the backplate facilitated bonding the plates together. One plate was grooved, so that when the plates were joined, ducts would be formed at the interface between the two plates. These ducts would then be filled with circulating water or other fluid to carry away excess heat from the mirror and reduce temperature related mirror distortions.

To achieve optimal optical qualities, materials such as silicon or BK-7 were used. Although these materials provided excellent optical qualities, they lacked sufficient ductility and other mechanical properties required for long life of the mirror and large mirror stroke. In addition, large stresses at the points on the backplate connected to actuators and internal stresses and tensions between the two plates led to shortened mirror life.

To obtain large stroke, and long life from the mirrors, metal mirrors were implemented. Metal mirrors had the ductility but lacked sufficient optical qualities and low internal stresses.

In an effort to find a material that was durable with a large stroke and excellent optical qualities, a material called SUPER INVAR 36 percent nickel alloy with a low coefficient of thermal expansion was tested. In accordance with conventional fabrication techniques, SUPER INVAR alloy was used to fabricate the faceplate and the backplate of the mirror. When the faceplate was polished to achieve the desired optical properties, heat generated from polishing of the material changed the internal stresses and induced distortions in the mirror which impaired the optical performance thereof.

Hence, a need exists in the art for a mirror with improved durability, stable optical qualities, sufficient mechanical properties to withstand large deflections, and good heat exchange capability.

SUMMARY OF THE INVENTION

The need in the art is addressed by the durable large stroke deformable mirror of the present invention. In the illustrative embodiment, the mirror includes a faceplate constructed of a first material, and a backplate constructed of a second material, different from the first material. The faceplate is connected to the backplate at an interface, and the backplate is connected to a set of actuators capable of inducing large mirror deflections.

In a specific embodiment, the first material is chosen for its excellent optical qualities and the second material is chosen for its flexibility, durability, and ductility for allowing large mirror deflections. To ensure durability of the connection at the interface, the faceplate and the backplate have relatively matching coefficients of thermal expansion. In addition, the interface is placed at the neutral axis of the mirror for reducing stresses at the interface. The interface also contains fluid filled channels for carrying heat away from the mirror to reduce temperature related mirror distortions.

DESCRIPTION OF THE INVENTION

Figure 1:
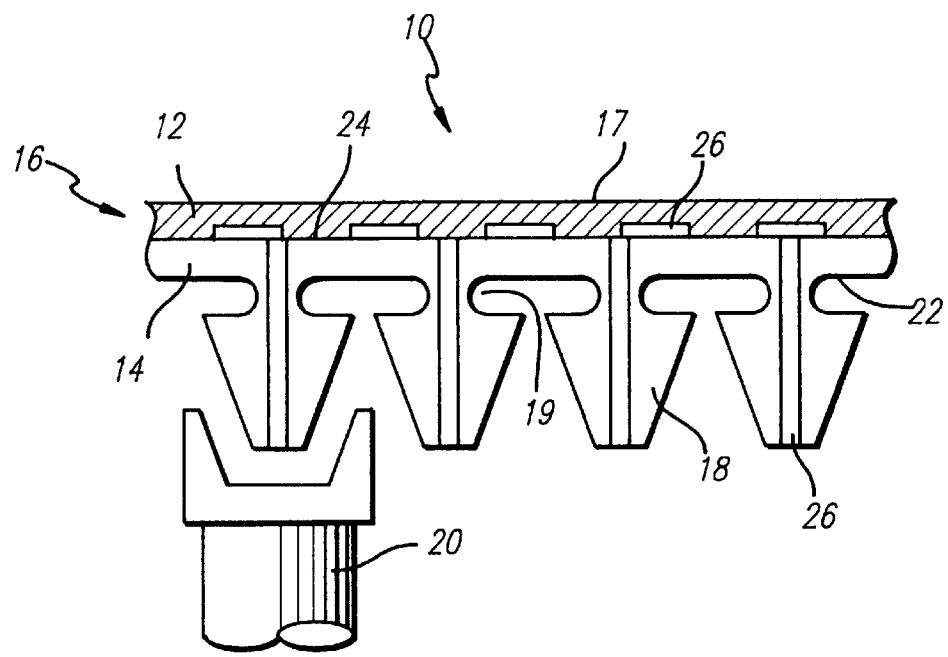
FIG. 1 is a cross-sectional diagram of a deformable mirror constructed in accordance with the teachings of the present invention.

The invention is described below in reference to the accompany drawings in which like reference numerals denote like parts. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a cross-sectional diagram of a deformable mirror 10 constructed in accordance with the teachings of the present invention. The deformable mirror 10 has an optical faceplate 12 connected to a mechanical backplate 14 at an interface 16. In the prior art (not shown), the mechanical plate and the optical plate are constructed of the same material. In the present invention, the materials for the faceplate 12 and the backplate 14 are specifically chosen for function in accordance with considerations well understood by those skilled in the art.

By polishing an optical surface 17 of the faceplate 12, an energy reflective surface is obtained. The optical surface 17 is an energy reflective surface for performing specific mirror functions such as reflecting a selected wavelength of electromagnetic energy, and passing another wavelength. The material for the faceplate 12 is chosen based on polish-ability, durability, optical stability, and ease of manufacture, scattering properties, and heat absorption characteristics. In the present specific embodiment silicon is used for the faceplate 12. Silicon has excellent polish-ability and is optically stable, durable, easy to manufacture, and has excellent heat transfer qualities.

Those skilled in the art will appreciate that other materials such as ULE, CERVIT, and BK-7 materials may be used for this purpose without departing from the scope of the present invention.

The backplate 14 provides support for the faceplate 12, and provides flexures 18 for connecting to electronic actuators 20. The flexures 18 and the backplate 14 are formed from the same piece of material. Large stresses occur at bases 22 of the flexures 18 where the flexures 18 are connected to the backplate 14. To maximize the durability of the mirror, the backplate 14 is constructed of a material that can withstand repeated stresses, and torques. The material is also flexible and ductile permitting large axial mirror strokes. In the present embodiment, the backplate 14 and the flexures 18 are constructed of metal. Circular grooves 19 are cut in the sides of the flexures 18 to facilitate bending of the flexures 18 for reducing stresses along the backplate 14.

Those skilled in the art will appreciate that other materials such as SUPER INVAR alloy may be used for this purpose without departing from the scope of the present invention.

At the interface 16, the faceplate 12 and the backplate 14 are connected with a conventional frit material 24. Heat exchange ducts 26 are cut in the back of the faceplate 12 and cut from the backplate 14 through the flexures 18 before bonding the faceplate 12 to the backplate 14. After bonding the faceplate 12 to the backplate 14, the ducts 26 are filled with fluid such as water for transferring heat from the mirror.

In the present embodiment, the silicon faceplate 12 is transparent to infrared energy. Infrared energy passing through the faceplate 12 is absorbed by the fluid in the ducts 26. The fluid flows from the mirror through the ducts 14, carrying away heat.

The frit material 24 sticks to the back surface of the faceplate 12 and the front surface of the backplate 14. Heat and pressure is applied to the mirror 10, which bonds the faceplate 12 to the backplate 14 via the frit material 24. The frit material 24 may also be replaced by an epoxy or other appropriate adhesive.

To help maximize the durability of the mirror 10, the interface 16 is placed at the neutral axis of the mirror. At the neutral axis, the material is at a transition between compression and tension. As a result, stresses applied to the frit connections 24 are minimized.

In order to maximize the strength of the frit connections 24, the materials of the faceplate 12 and the backplate 14 are chosen with matching coefficients of thermal expansion (CTE). If two bonded materials have significantly different coefficients of thermal expansion, one bonded material will expand differently than the other material at a given temperature. Different material expansions lead to increased stresses at the connection between the materials, and decreased connection durability.

Figure 2:
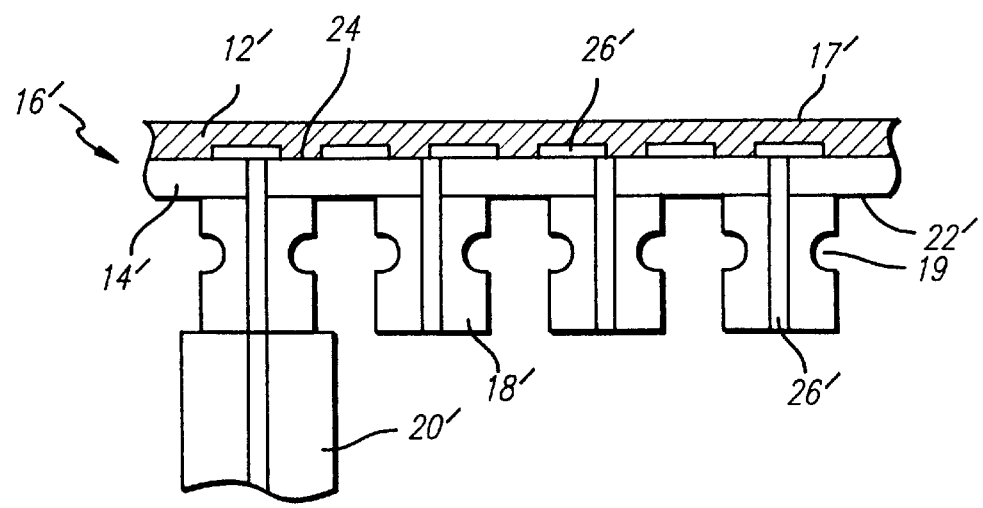
FIG. 2 is a cross-sectional diagram of an alternative embodiment of the invention of FIG. 1.

FIG. 2 is a cross-sectional diagram of an alternative embodiment of the invention of FIG. 1. The embodiment of FIG. 2 is similar to the embodiment of FIG. 1 with several exceptions. The backplate 14' is constructed of SUPER INVAR alloy. The coefficient of thermal expansion of SUPER INVAR alloy matches that of materials such as ULE and CERVIT materials that are suitable for the faceplate 12'. The faceplate 12' has an optically polished surface 17' for selectively reflecting, or passing given wavelengths of electromagnetic energy.

Flexures 18' are not continuous with respect to the backplate 14' in that the flexures 18' are constructed of a different piece of material than the backplate 14'. The flexures 18' are brazed, soldered, or welded to the backplate 14' at the flexure bases 22'. Heat exchange ducts 26' are cut through the flexures 18' and are aligned with ducts 18' in the backplate 14', so that fluid may flow freely from the backplate 14' through the flexures 18'. The flexures 18' are constructed of a flexible metal material such as steel. Actuators 20' are shown bonded to the flexures 18' for controlling the mirror 10' deflections.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A durable large stroke deformable mirror comprising:

an at least partially reflective planar faceplate constructed of a first material said first material being deformable and a planar, flexible backplate constructed of a second material different from said first material and mounted in a parallel face-to-face relation with respect to said faceplate, said first material and said second material having matching coefficients of thermal expansion.

2. The invention of claim 1 including means for inducing mirror deflections.

3. The invention of claim 2 wherein said means for inducing mirror deflections includes a set of actuators.

4. The invention of claim 3 further including connecting means for connecting said backplate to said set of actuators.

5. The invention of claim 4 including flexures disposed on said backplate whereby actuators may be connected to the backplate via the flexures.

6. The invention of claim 1 wherein said interface contains channels for channeling heat from said mirror.

7. The invention of claim 6 wherein the channels are filled with a fluid for transporting heat.

8. The invention of claim 1 wherein said first material is silicon.

9. The invention of claim 8 wherein said second material is metal.

10. The invention of claim 1 wherein said second material is a low coefficient of thermal expansion nickel alloy.

11. The invention of claim 1 including a frit material at said interface between said faceplate and said backplate.

12. A durable large stroke deformable mirror comprising:

a polished optical faceplate constructed of a first material, said first material being deformable;

an interface with hollow grooves for channeling heat away from the mirror;

a frit material deposited at said interface;

a planar, flexible backplate constructed of a second material different from said first material, with a coefficient of thermal expansion that matches said first material, and mounted in a parallel face-to-face relation at said interface; and a set of actuators connected to said backplate for inducing mirror deflections.

* * * * *